INVENTORS
GERALD B. ROSENBERGER
OLIVER W. JOHNSON JR.
BY George Baron
ATTORNEY

United States Patent Office 3,022,468

Patented Feb. 20, 1962

3,022,468
SUPERCONDUCTOR OSCILLATOR

Gerald B. Rosenberger, North Wappingers Falls, and Oliver W. Johnson, Jr., Brooklyn, N.Y., assignors to International Business Machines Corporation, New York, N.Y., a corporation of New York Filed June 13, 1958, Ser. No. 741,898
8 Claims. (Cl. 331—107)

This invention relates to superconductor devices, and more particularly to a superconductive circuit capable of generating oscillations.

The properties and characteristics of superconductives have been treated in such texts as "Superfluids" volume 1 by Fritz London, published in 1950 in New York by John Wiley and Sons, Inc., and "Superconductivity" by D. Shoenberg, published in 1952 in London by the Cambridge University Press. In general, the superconductor is a metal, an alloy, or a compound that is maintained at very low temperatures, for example, from 17° Kelvin, to the practical attainability of absolute zero in order that it may present no resistance to current flow therein. It was discovered that in the case of mercury, its electrical resistance decreased as a function of decreasing temperature, until at a given temperature, about 4.12° Kelvin, the resistance very sharply vanished, or its measurement was too small to be detected. The temperature at which the transition to zero resistance took place in mercury was referred to as its critical temperature; its state upon reaching zero resistance was that of a superconductor.

The critical temperature varies with different materials, and for each material it is lowered as the intensity of the magnetic field around the material is increased from zero. Once a body of material is rendered superconductive, it may be restored to the resistive or normal state by raising the temperature of the body beyond its critical temperature. The body of material remains in its resistive state so long as it is maintained at or beyond its critical temperature. This temperature resistance characteristic of superconductors is exploited in the present invention to attain an electrical oscillator.

The superconductive oscillator for producing oscillations will comprise a superconducting bar in parallel with a conductor of relatively low but finite resistivity. The oscillations are produced when a source of current is made to switch rapidly from the superconductive path to the low resistive shunt path and back again to the superconductive path. The transient current distribution will be inversely proportional to the inductance of the two branches when current is first applied. All the current will switch towards the zero resistance, superconducting, branch as a function of the $$\frac{L}{R}$$

time constant of the circuit. Before a steady state condition is achieved, the current in the superconducting path exceeds the critical value, causing resistance to be restored in the superconductor. As soon as the critical current of the superconducting path is exceeded, current will switch to the resistive path. The ratio of the currents after the superconductor goes normal will be dependent primarily on the resistive values of the now normal superconductive path and the low resistor.

It is an object of the present invention to obtain a superconductive oscillatory circuit.

It is a further object to make a superconductor oscillator that is extremely reliable in operation.

It is yet another object to make an oscillator which is extremely small in size.

Other objects will be pointed out in the following description and claims and illustrated in the accompanying drawings, which disclose, by way of example, the principles of the invention and the best modes which have been contemplated of applying those principles.

Figure 1:
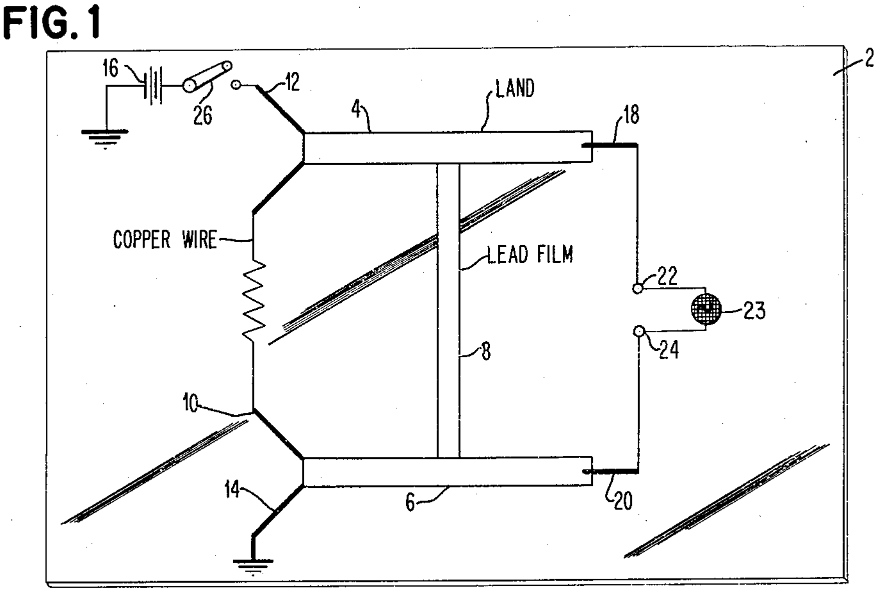
FIG. 1 is an embodiment of the low temperature oscillator forming the present invention.

Referring to FIG. 1 of the drawings, there is shown an oscillator for use at very low temperatures wherein 2 is a suitable electrical insulating but heat-conducting substrate upon which are deposited by vacuum deposition techniques a pair of superconductive lands or raised portions 4 and 6. A ribbon 8 of superconductive material bridges such lands 4 and 6. In parallel with such ribbon 8 is a conductor 10 of relatively low but finite resistance. Superconductive elements 12 and 14, in the form of very thin foils, are secured to their respective lands 4 and 6 by heat and pressure, such foils 12 and 14 serving respectively as the input and output terminals for a D.C. source represented by battery 16. Output leads 18 and 20 are similar to superconductor foils 12 and 14, such leads being connected to output terminals 22 and 24. The output waveforms of the oscillator can be sensed at such terminals 22 and 24.

A representative oscillator would have ribbon 8 composed of evaporated lead, 1000 angstroms thick and 0.006 inch wide, and about a half inch in length. The resistive element 10 would be a half inch of #42 copper wire. The lands or raised portions 4 and 6 are composed of evaporated lead of the order of 10,000 angstrom units. When the entire oscillator is immersed in its bath of liquid helium, the copper wire 10 never becomes superconductive, whereas elements 4, 6, 12, 14, 18 and 20 always remain superconductive. Ribbon 8 remains superconductive until its critical current value is reached. The resistance of the superconductive ribbon 8, when it changes from its superconductive state to its normal resistive state, is about one hundred times the resistance of copper wire 10.

Figure 3:
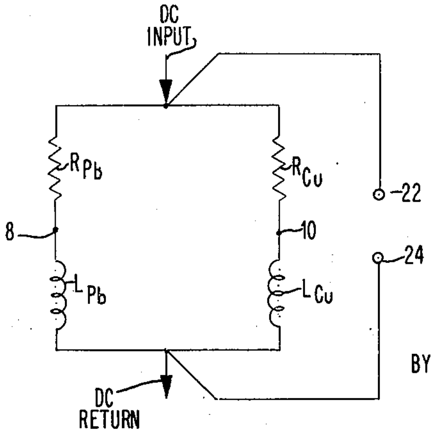
FIG. 3 is an electrical equivalent circuit of the embodiment shown in FIG. 1.
Figure 4:
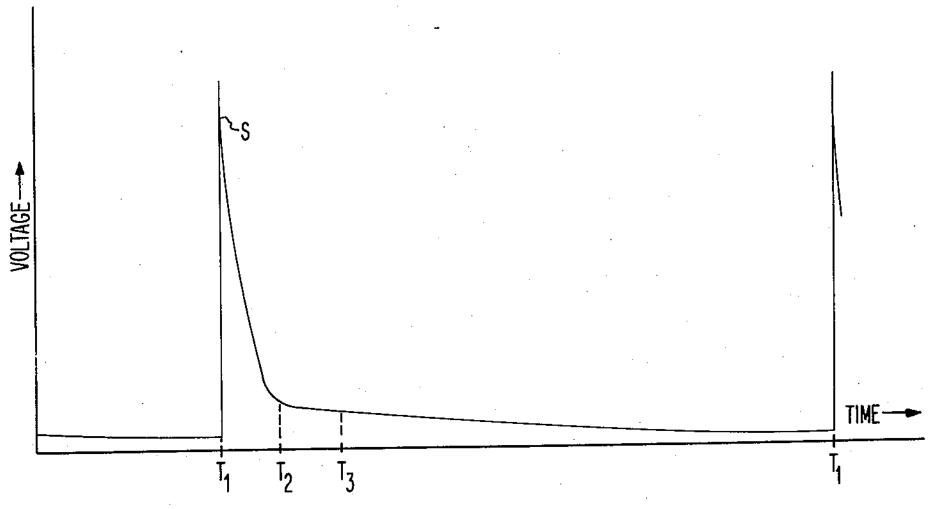
FIGS. 4 and 5 represent respectively voltage-time and current-time diagrams of the oscillator of FIG. 1.
Figure 5:
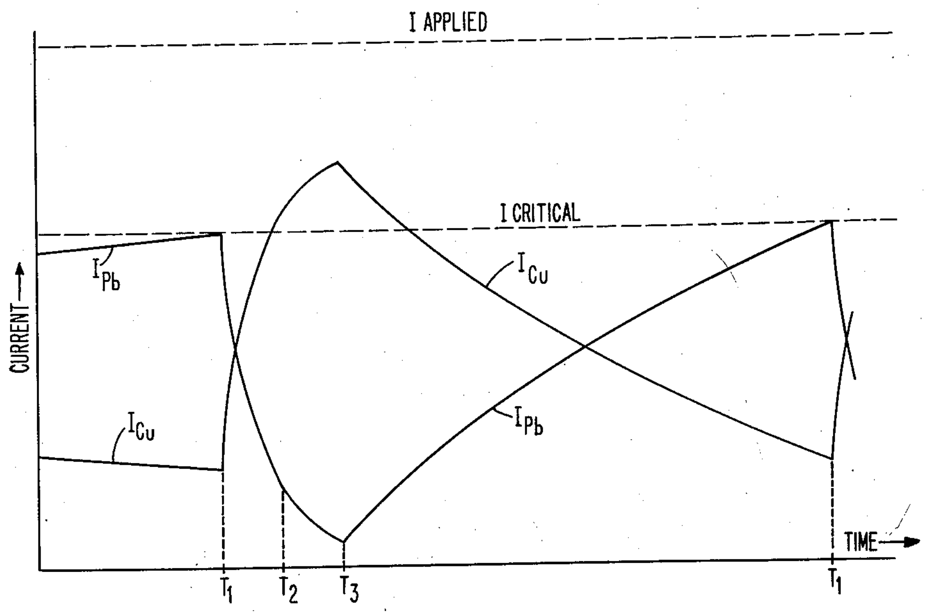

A description of the oscillator of FIG. 1 can be better understood if reference is also had to FIGS. 3, 4 and 5. In FIG. 3, $R_{pb}$ represents the resistance and $L_{pb}$ the inductance of superconductive element 8 and $R_{cu}$ and $L_{cu}$ are respectively the resistance and inductance of copper wire 8. When switch 26 of FIG. 1 is closed, the current from battery 16 flowing from land 4 to land 6 will momentarily divide in the copper 10 path and lead path 8 inversely as the inductances of such two paths, but will then flow entirely through superconductive path 8 because of its zero resistance. If the current from battery 16 exceeds the critical current ($Icr$) of the lead film 8, the latter is driven normal resistive and its temperature rises due to $I^2_{pb}R_{pb}$ heating. Since the resistance of the now normal conducting lead ribbon 8 is much greater than that of copper wire 10, almost the entire applied direct current switches to the copper path 10. Such current flow in wire 10 continues until the lead ribbon 8 cools sufficiently to return to the superconducting state. The lead ribbon 8 remains in its superconductive state until the current it is carrying exceeds the critical current of the lead ribbon, and the cycle is repeated. The frequency of such oscillations is read by an appropriate frequency measuring device such as an oscilloscope 23, placed across the output terminals 22 and 24.

The observed voltage developed across the device and the deduced current waveforms are shown in FIGS. 4 and 5. The critical current is reached in the lead ribbon 8 at time $T_1$, causing the lead to go resistive and heat up.

Most of the current from battery source 16 will switch to the copper path 10, the switching time being a function of $$\frac{L_{cu}+L_{pb}}{R_{cu}+R_{pb}}$$

The voltage spike S in FIG. 4 is due to the $$L\frac{di}{dt}$$

product caused by such rapidly switching current. Since the rate of change of current is a maximum at time $T_1$, the peak output voltage appears at this time. The voltage falls in accordance with the relationship $$V=V_0E-\frac{RT}{L}$$

where $$\frac{R}{L}=\frac{R_{cu}+R_{pb}}{L_{cu}+L_{pb}}$$

and where $R_{pb}$ is a function of the varying temperature of the lead ribbon 10. The voltage step between $T_2$ and $T_3$ is due to the product $$\frac{R_{pb}\times R_{cu}}{R_{pb}+R_{cu}}$$

where I is the applied current. The period between $T_2$ and $T_3$ represents a thermal time constant or thermal delay which is a function of the difference between the heat flowing away from lead ribbon 8 and the $I^2_{pb}R_{pb}$ heat that is being generated in the ribbon during the normal resistive state or transition state of such ribbon.

At time $T_3$, the lead ribbon 8 returns to the superconducting state, causing the current to switch back to the superconductive lead path 8. Such switching time is a function of $$\frac{L_{cu}+L_{pb}}{R_{cu}}$$

which is much larger than the switching time in going from path 8 to path 10 because $R_{pb}>>R_{cu}$ during the latter transition. In the particular oscillator shown, time $T_3$ to $T_1$ will always be much longer than time $T_1$ to $T_2$.

Figure 2:
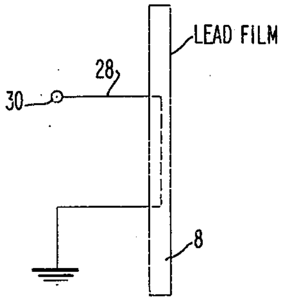
FIG. 2 represents the invention modified to form a one-shot multivibrator.

FIG. 2 shows an embodiment of the invention as a one-shot multivibrator. Another thin film 28 is associated with but insulated from lead ribbon 8. An input terminal 30 permits the application of a very short duration pulse to such thin film 28. The current from battery 16 is chosen so that it only biases lead ribbon 8 towards its normal resistive state but is insufficient to drive such ribbon to its normal resistive state. The small duration pulse, of a polarity that induces a field that is additive to the field created by the bias current, is applied to input terminal 30 and causes lead ribbon 8 to go resistive and heat up, switching the bias current to the resistive leg 10. When the ribbon 8 cools down to its superconductive temperature, the bias current persists in such ribbon. The output produced at terminals 22 and 24 is a single pulse since no oscillations are supported by the device of FIG. 2. The current from battery 16, by itself, is always less than the critical current of lead ribbon 8.

The frequency of oscillations will depend upon the supply current 16, the heat relaxation time of the lead ribbon 8, and the $$\frac{L}{R}$$

time constant of the entire circuit. By judicious choice of a current supply, insulating material or substrate 2 beneath the superconductive elements of the oscillator or selection of different materials for elements 8 and 10, one may vary the frequency of oscillations obtainable by the present invention. One scheme for lowering the overall inductance of the circuit would consist of placing a grounded superconducting plane over the oscillator which would serve as a magnetic shield. Such shield would lower the inductance of the superconductive element 8 of the oscillating circuit.

The present invention has particular utility in serving as a master clock in computers employing cryogenic components. Where used as a single-shot multivibrator, the output obtained is made substantially independent of the triggering pulse applied to such single-shot oscillator.

It will be understood various omissions and substitutions and changes in the form and details of the device illustrated and in their operation may be made by those skilled in the art without departing from the spirit of the invention. It is the intention, therefore, to be limited only as indicated by the scope of the following claims.

What is claimed is:

1. A superconducting oscilaltor comprising a superconducting first path and a normal resistive second path in electrical parallel with said superconducting path, a source of direct current applied to said parallel paths, said direct current initially flowing into both paths inversely as their respective inductances and then inversely as their respective resistances, whereby such current will flow entirely through said superconductive path until such current reaches the critical current of said superconductive path.

2. A superconducting oscillator as defined in claim 1 wherein the resistance of the superconducting path after its transition from the superconducting state to the resistive state is considerably greater than that of the normal resistive path.

3. A superconducting oscillator comprising a superconducting first path having a predetermined heat relaxation time and a normal resistive second path in electrical parallel with said first path, means for applying a source of direct current to said parallel paths so that said direct current will momentarily flow into both paths inversely as their respective inductances and then solely into said superconductive path until such current reaches the critical current of said superconductive path to drive said superconductive path resistive and raise its temperature to its critical temperature, whereupon the current then divides in accordance with the respective resistances of said two paths, said current returning to said first path after said heat relaxation time has expired.

4. A superconducting oscillator as defined in claim 1 including means for sensing each time such current returns from the normal resistive path to said superconductive path.

5. A superconducting oscillator comprising a superconducting first path having a predetermined heat relaxation time and a normal resistive second path which remains normal resistive throughout the operation of such oscillator, a source of direct current applied to said parallel paths whereby such current will momentarily flow into both paths inversely as their respective inductances and then solely into said superconducting path until such current reaches the critical current for said superconductive path so as to drive the latter normal resistive and raise its temperature whereupon the current then divides in accordance with the respective resistances of said two paths, said current returning to said first path after said heat relaxation time has expired, and means for sensing such current returns.

6. A superconducting one-shot oscillator comprising a superconducting first path having a predetermined heat relaxation time and a normal resistive second path which remains normal resistive throughout the operation of such oscillator, a source of direct current applied to said parallel paths whereby such direct current will momentarily flow into both paths inversely as their respective inductances and then solely into said superconductive path, such current being less than the critical current for said superconductive path, pulse means for inducing a second current in said superconductive path which is additive to said direct current so that the sum is sufficient to drive said superconductive path to its normal resistive state and raise its temperature whereby substantially all of said direct current is made to switch to the normal resistive branch, said direct current returning to said first path when the latter returns superconductive after the expiration of said pulse means and of said heat relaxation time.

7. A superconducting one-shot oscillator as defined in claim 6 wherein the resistance of the superconductive first path in its normal resistive state is considerably greater than the normal resistance of the second path.

8. A device as defined in claim 6 including means for sensing such returns of said direct current from the second path to the first path.

References Cited in the file of this patent

UNITED STATES PATENTS

| | | |
|---|---|---|
| 1,792,781 | Thilo | Feb. 17, 1931 |
| 2,189,122 | Andrews | Feb. 6, 1940 |
| 2,487,279 | Stalhane | Nov. 8, 1949 |
| 2,666,884 | Ericsson et al. | Jan. 19, 1954 |
| 2,725,474 | Ericsson et al. | Nov. 29, 1955 |
| 2,877,448 | Nyberg | Mar. 10, 1959 |

OTHER REFERENCES

Article, "The Summing Point," in Automatic Control. August 1956, pages 21, 22, 23.